(12) United States Patent
Mahasintunan (10) Patent No.: US 7,757,229 B2
(45) Date of Patent: Jul. 13, 2010

(54) REFLECTIVE, XML-BASED FRAMEWORK FOR THE CONSTRUCTION OF COMMON APPLICATION LAUNCHERS

(75) Inventor: Kim Mahasintunan, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 1373 days.

(21) Appl. No.: 11/199,610

(22) Filed: Aug. 9, 2005

(65) Prior Publication Data

US 2007/0038992 A1 Feb. 15, 2007

(51) Int. Cl.
*G06F 9/445* (2006.01)

(52) U.S. Cl. ................. 717/174; 717/175; 717/176; 717/177; 717/178

(58) Field of Classification Search .......... 717/174–178
See application file for complete search history.

(56) References Cited

U.S. PATENT DOCUMENTS

| | | | |
|---|---|---|---|
| 6,286,051 B1 | 9/2001 | Becker et al. | |
| 6,502,234 B1 | 12/2002 | Gauthier et al. | |
| 6,546,554 B1 | 4/2003 | Schmidt et al. | |
| 6,891,552 B1* | 5/2005 | Bush | 715/762 |
| 2002/0092004 A1 | 7/2002 | Lee et al. | |
| 2002/0099845 A1 | 7/2002 | Passanisi | |
| 2002/0129129 A1 | 9/2002 | Bloch et al. | |
| 2003/0212987 A1 | 11/2003 | Demuth et al. | |
| 2004/0015955 A1* | 1/2004 | Bourke-Dunphy et al. | 717/174 |
| 2004/0172597 A1 | 9/2004 | Canali et al. | |
| 2004/0183830 A1 | 9/2004 | Cody et al. | |
| 2004/0230967 A1 | 11/2004 | Yuknewicz et al. | |
| 2004/0268344 A1 | 12/2004 | Obilisetty | |
| 2005/0021935 A1* | 1/2005 | Schillings et al. | 713/1 |
| 2005/0210459 A1* | 9/2005 | Henderson et al. | 717/168 |
| 2006/0117061 A1* | 6/2006 | Weiss | 707/104.1 |
| 2006/0271914 A1* | 11/2006 | Gopal et al. | 717/122 |
| 2006/0285656 A1* | 12/2006 | Saborowski et al. | 379/67.1 |
| 2007/0240124 A1* | 10/2007 | Taneda et al. | 717/129 |

* cited by examiner

*Primary Examiner*—Wei Y Zhen
*Assistant Examiner*—Junchun Wu
(74) *Attorney, Agent, or Firm*—Hovey Williams LLP (57) ABSTRACT

Apparatus, methods, and computer program products are disclosed for installing computer applications executes installation actions that are common from one implementation to the next using user-supplied, application-specific details for each installation. The teachings involve parsing an XML file to determine attributes of a user interface and attributes of the installation actions. The user interface is then constructed according to user-defined interface attributes and the installation actions are performed according to user-defined installation attributes.

14 Claims, 10 Drawing Sheets

REFLECTIVE, XML-BASED FRAMEWORK FOR THE CONSTRUCTION OF COMMON APPLICATION LAUNCHERS

FIELD

The present invention relates to the field of computer application installation software. More particularly, the invention relates to a reflective, XML-based framework for the construction of common application installation launchers.

BACKGROUND

When a software application is created, special steps must be taken to install the application on a user's computer before the application can be used. For example, the application may include a plurality of program files that must be saved in particular locations on the computer's hard drive. Therefore, each software application is typically sold with a customized installation program for installing the application on the user's computer or computer network.

Such customized installation programs are themselves computer programs. While each program is unique to the application it installs, certain aspects of application installation are common from one installation to the next. For example, while the application files to install on the host computer for each application are necessarily unique, the process of installing the files may be identical from one application to the next.

Typically, computer programmers are called upon to develop application installation programs in order to ensure that all relevant application files are properly identified and installed. Unfortunately, much of the time spent by programmers to develop installation programs is used to duplicate software that is common from one installation program to the next, as explained above. This redundancy results in increased cost of the computer applications.

Accordingly, there is a need for improved methods of creating application launchers that do not suffer from the problems and limitations of the related art.

SUMMARY

The present teachings solve the above-described problems and provides a distinct advance in the art of computer application installation software. More particularly, the present teachings involve methods of installing an application on a computer that identifies and preserves installation actions that are common from one implementation of the method to the next, thus eliminating redundancy in writing installation software.

Various embodiments involve a computer-readable medium encoded with a computer program for enabling a computer to perform a method of installing an application. The various methods comprise the steps of reading a user-created computer file to determine an attribute of a user interface, and reading the computer file to determine an attribute of a pre-determined installation action. The user interface is displayed by applying the attribute of the interface to a pre-determined framework, and the installation action is executed according to the attribute of the action in response to a user input received via the user interface.

Various embodiments are also implemented by way of a computer program and further involve requesting data from a resource object and executing a user-defined action. Various embodiments comprise the steps of reading a user-created computer file to determine an attribute of a user interface, reading the computer file to identify a user-supplied resource object, and requesting user interface data from the resource object by communicating to the object a key provided in the computer file. The computer file is read to determine an attribute of a pre-determined installation action and to identify computer code for executing the user-defined installation action. The user interface is displayed by applying the attribute of the interface to a pre-determined framework. The pre-determined installation action is executed according to the attribute of the action in response to a first user input received via the user interface, and the user-defined installation action is executed in response to a second user input received via the user interface.

According other various embodiments, a user-created XML file is parsed to determine a plurality of user-specified attributes of the user interface, wherein the attributes include button information and image information. User interface data is requested from a user-supplied resource object that is identified in the XML file by communicating to the object a key that is given in the XML file, and a plurality of text strings are received from the resource object and presenting the text strings as part of the user interface, wherein each text string is associated with an element of the user interface as indicated in the XML file.

The XML file is further parsed to determine a user-specified attribute of each of a plurality of pre-determined installation actions, and to identify computer code for executing a user-defined installation action. A plurality of buttons are displayed in a first pre-defined panel of the user interface, wherein each button is displayed according to a color indicated in the XML file. The contents of a user-supplied computer file are displayed in response to a user selecting a first button, wherein the computer file is identified in the XML file. A separate application is launched in response to the user selecting a second button, wherein the application is launched with start-up characteristics defined in the XML file. An application file is installed on the computer in response to the user selecting a third button, wherein the application file is identified in the XML file.

It is understood that both the foregoing general description and the following description of various embodiments are exemplary and explanatory only and are not restrictive of the invention as claimed. The accompanying drawings, which are incorporated in and constitute a part of this specification, illustrate some embodiments, and together with the description serve to explain the principles of the embodiments described herein.

BRIEF DESCRIPTION OF THE DRAWINGS

The skilled artisan will understand that the drawings, described below, are for illustration purposes only. The drawings are not intended to limit the scope of the present teachings in any way.

DESCRIPTION OF VARIOUS EMBODIMENTS

Reference will now be made in detail to some embodiments, examples of which are illustrated in the accompanying drawings. Wherever possible, the same reference numbers are used throughout the drawings to refer to the same or like parts.

Figure 1:
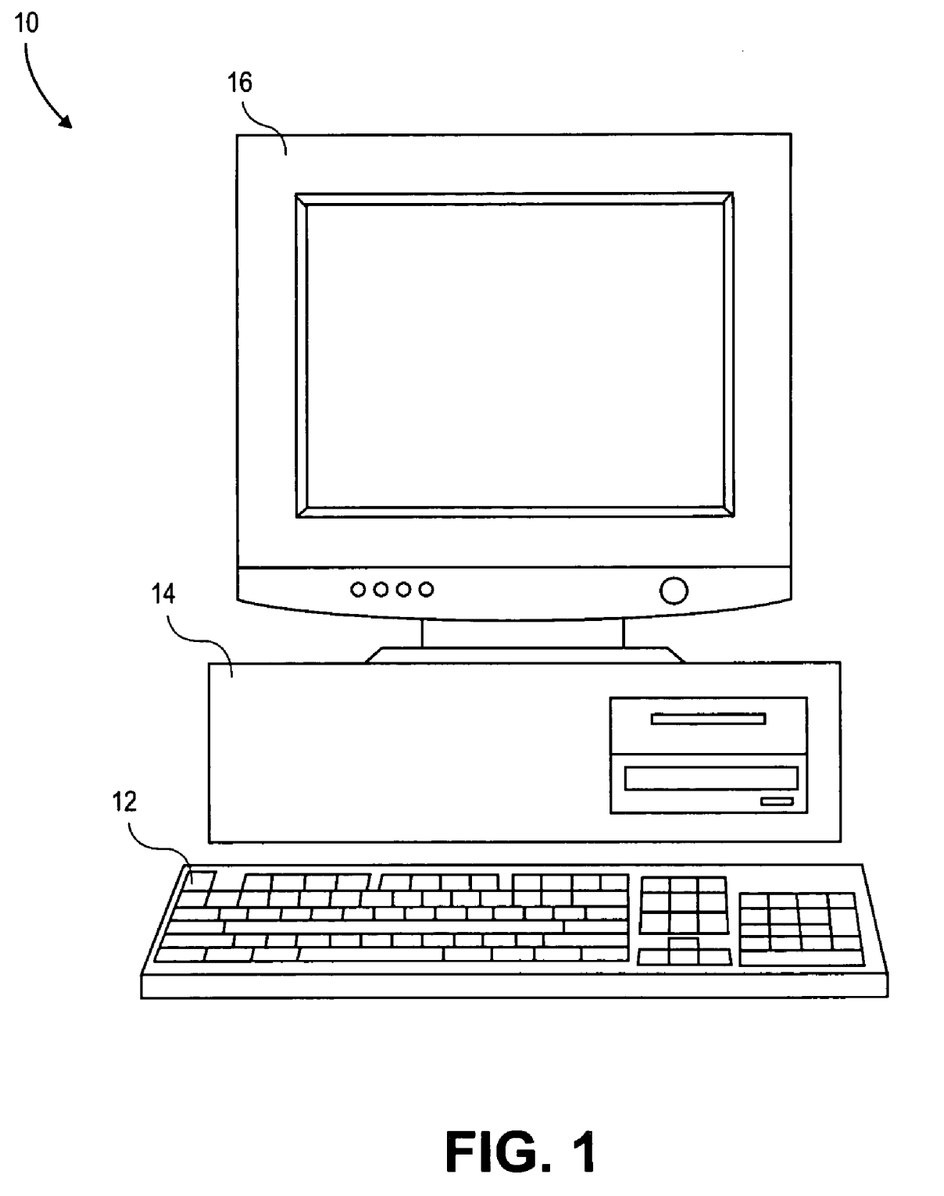
FIG. 1 is an exemplary computer for implementing a program of the present invention.
Figure 2:
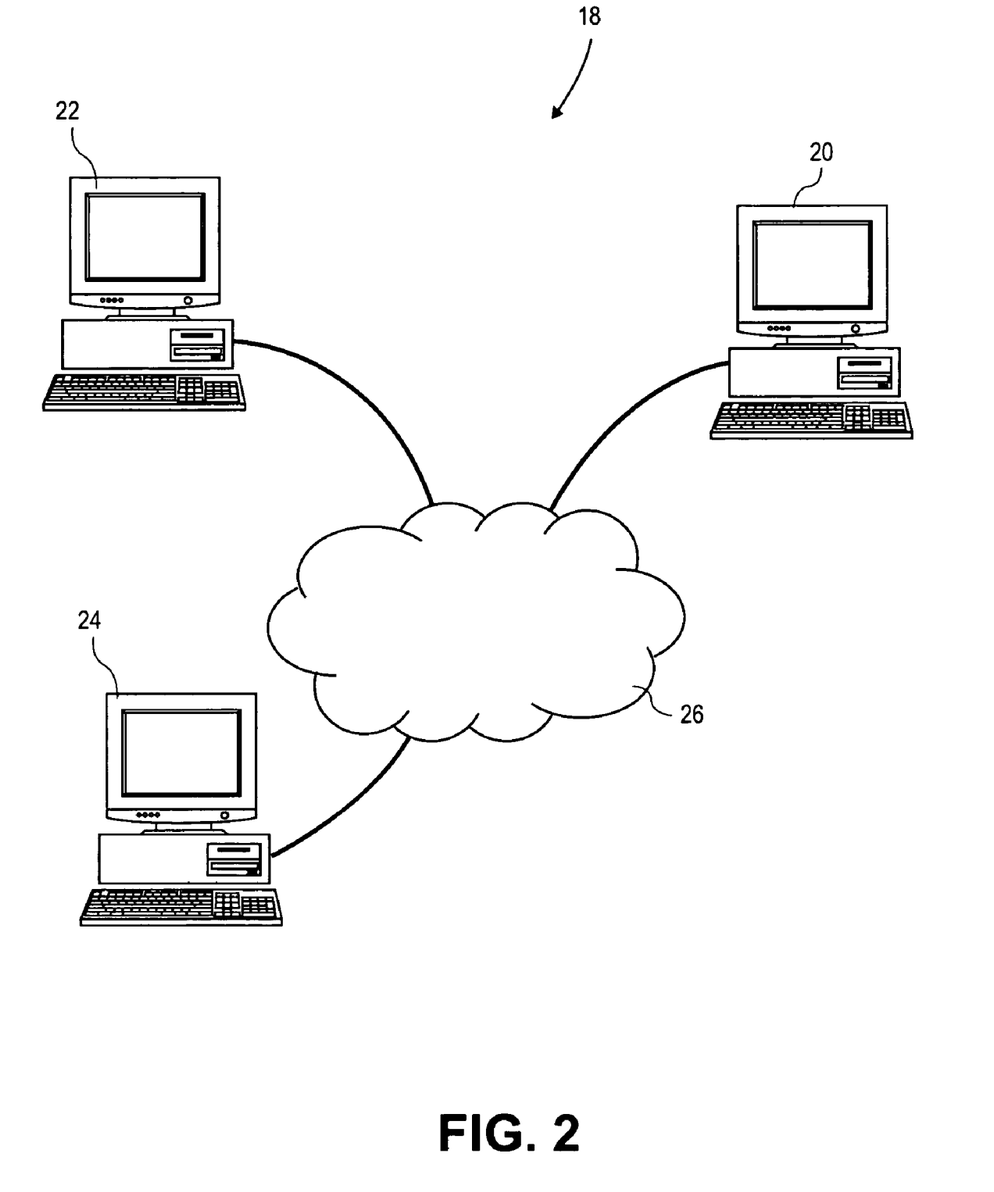
FIG. 2 is an exemplary computer network of which the computer of FIG. 1 may form a part.

The present teachings relate to a method of installing an application on a computer, wherein installation actions common from one implementation of the method to the next are identified and preserved to eliminate redundancy in writing computer programs for implementing the method. Methods consistent with the present teachings are especially well-suited implementation on a computer or computer network, such as the computer 10 illustrated in FIG. 1 that includes a keyboard 12, a processor console 14, and a display 16. The computer 10 may be a part of a computer network, such as the computer network 18 illustrated in FIG. 2 that includes one or more client computers 20, 22 and one or more server computers 24 interconnected via a communications system 26. The present invention will thus be generally described herein as a computer program. It will be appreciated, however, that the principles of the present invention are useful independently of a particular implementation, and that one or more of the steps described herein may be implemented without the assistance of a computing device.

The present invention can be implemented in hardware, software, firmware, or a combination thereof. In a preferred embodiment, however, the invention is implemented with a computer program. The computer program and equipment described herein are merely examples of a program and equipment that may be used to implement the present invention and may be replaced with other software and computer equipment without departing from the scope of the present teachings.

Computer programs consistent with the present teachings can be stored in or on a computer-readable medium residing on or accessible by a host computer for instructing the host computer to implement the method of the present invention as described herein. The computer program preferably comprises an ordered listing of executable instructions for implementing logical functions in the host computer and other computing devices coupled with the host computer. The computer program can be embodied in any computer-readable medium for use by or in connection with an instruction execution system, apparatus, or device, such as a computer-based system, processor-containing system, or other system that can fetch the instructions from the instruction execution system, apparatus, or device, and execute the instructions.

The ordered listing of executable instructions comprising the computer program of the present invention will hereinafter be referred to simply as "the program" or "the computer program." It will be understood by persons of ordinary skill in the art that the program may comprise a single list of executable instructions or two or more separate lists, and may be stored on a single computer-readable medium or multiple distinct media. In the context of this application, a "software object" is a programming unit that groups together a data structure (e.g., instance variables) and the operations (e.g., methods) that can use or affect that data.

In the context of this application, a "computer-readable medium" can be any means that can contain, store, or communicate the program for use by or in connection with the instruction execution system, apparatus, or device. The computer-readable medium can be, for example, but not limited to, an electronic, magnetic, optical, electro-magnetic, or semi-conductor system, apparatus, or device. More specific, although not inclusive, examples of the computer-readable medium would include the following: a portable computer diskette, a random access memory (RAM), a read-only memory (ROM), an erasable, programmable, read-only memory (EPROM or Flash memory), and a portable compact disk read-only memory (CDROM).

Figure 3:
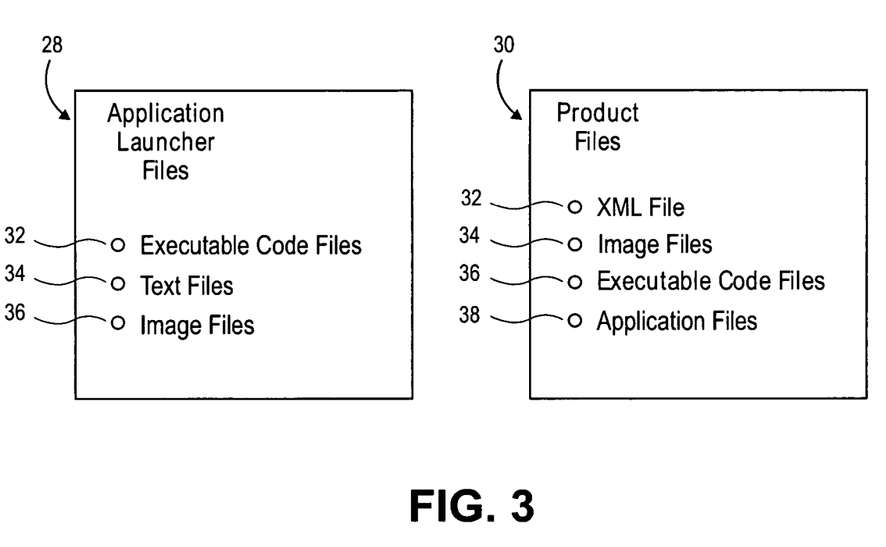
FIG. 3 is a file grouping scheme used by the present invention, wherein predefined application launcher files are maintained in a first group and user-supplied product files are maintained in a second group.

In various embodiments, a computer program is included in a pre-defined group of computer files denoted collectively as the "Application Launcher Files" 28 illustrated in FIG. 3. The program interacts with a user-provided second group of computer files denoted collectively as the "Product Files" 30, also illustrated in FIG. 3. The application launcher files 28 and product files 30 are grouped according to a format that enables manipulation of the files as a group. Each group of files is preferably collected in a JAVA™ archive (JAR) file. The Java™ Archive (JAR) file format enables multiple files to be bundled into a single archive file. Typically, JAR files contain class files and auxiliary resources associated with the class files.

The application launcher 28 includes computer files that are generic to each implementation of the program. The application launcher 28 includes, for example, executable code files 32 as well as files that contain various resources associated with the program, such as, for example, text files 34 and image files 36. It will be appreciated that the executable code files 32 may also include non-executable resource data, such as data fields included in a class file.

The program of the present invention is embodied in the executable code files 32 of the application launcher 28. Generally, the program reads a user-created computer file to determine a user-specified attribute of a user interface, and to determine a user-specified attribute of a pre-determined launch action. The program then displays the user interface by applying the user-specified attribute of the interface to a pre-determined framework, and executes the launch action according to the user-specified attribute of the action in response to a user input received via the user interface. These functions are described in greater detail below.

Figure 4:
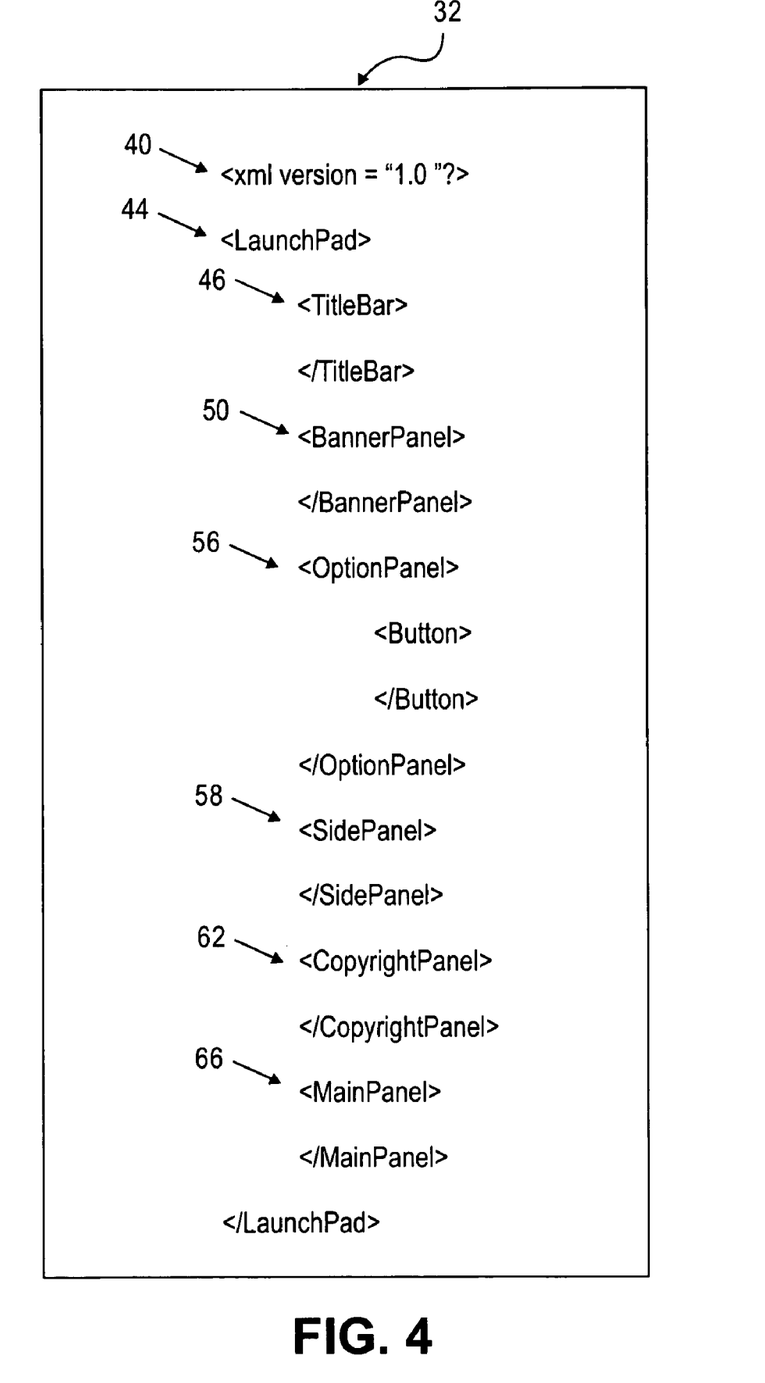
FIG. 4 is an exemplary user-provided XML file used by the program of the present invention to determine user-defined attributes of a user interface and user-defined attributes of actions performed in response to a user input submitted via the user interface.

The product files 30 include computer files that are provided by the user and are specific to a particular software application that the program will install on a computer. Thus, while the application launcher files 28 are substantially similar or in various embodiments substantially identical across various implementations of the program, the product files 30 will vary from one implementation to the next. The product files 30 include an XML file 32, as well as one or more image files 34, executable code files 36, and application files 38. The XML file 32 generally defines or identifies images, strings, and other attributes associated with the user interface; actions to be taken in response to user input received via the user interface; and application files to install. XML files are structured documents, and as such includes data as well as metadata (data describing the data or defining a structure of data in the file). An exemplary XML file is illustrated in FIG. 4.

The first line 40 of the XML file contains an XML declaration. While the XML declaration is not required, its presence explicitly defines the document as an XML document and indicates the version of XML to which it was authored. Following the XML declaration is a plurality of elements that define the various attributes of a user interface 42 (illustrated in FIG. 5) as well as actions to take in response to a user interface 42 event.

A main section of the XML file is contained within the "LaunchPad" element 44. Within the main section are various elements that define the user interface 42, including a "TitleBar" element 46 that defines or identifies text to be presented in a title bar 48 (illustrated in FIG. 7) of the user interface 42. The contents of the element 46 preferably indicate a JAVA™ resource bundle and corresponding key from which to request the title bar text. Computer code pertaining to an exemplary JAVA™ resource bundle is presented in Appendix A. To request the title bar text from the resource bundle of Appendix A, the program would simply submit the key "Title". Various other types of objects may be used as resource bundles, including, for example, objects created entirely by the user using any of a variety of programming languages.

The "BannerPanel" element 50 defines or indicates an attribute of a banner panel 54 of the user interface 42, including an image to be displayed in the banner panel 54. The "OptionPanel" element 56 of the XML file defines or indicates attributes of an option panel 58 of the user interface 42. Particularly, the OptionPanel element 56 specifies a number of buttons 88, 90, 92, 94, 96 of FIG. 7 to appear in the option panel 58, as well colors and text associated with each button. A sub-node associated with each button is included in the OptionPanel element 56, wherein each sub-node includes information pertaining to a corresponding button of the user interface 42. The OptionPanel element 56 indicates, for example, a JAVA™ resource bundle that contains text to present on the face of each button as well as float-over text associated with each button. The resource bundle may also include colors associated with each button such as unselected, selected, and highlighted button colors. The OptionPanel element 56 further includes one or more user-defined attributes of actions associated with the buttons.

Figure 7:
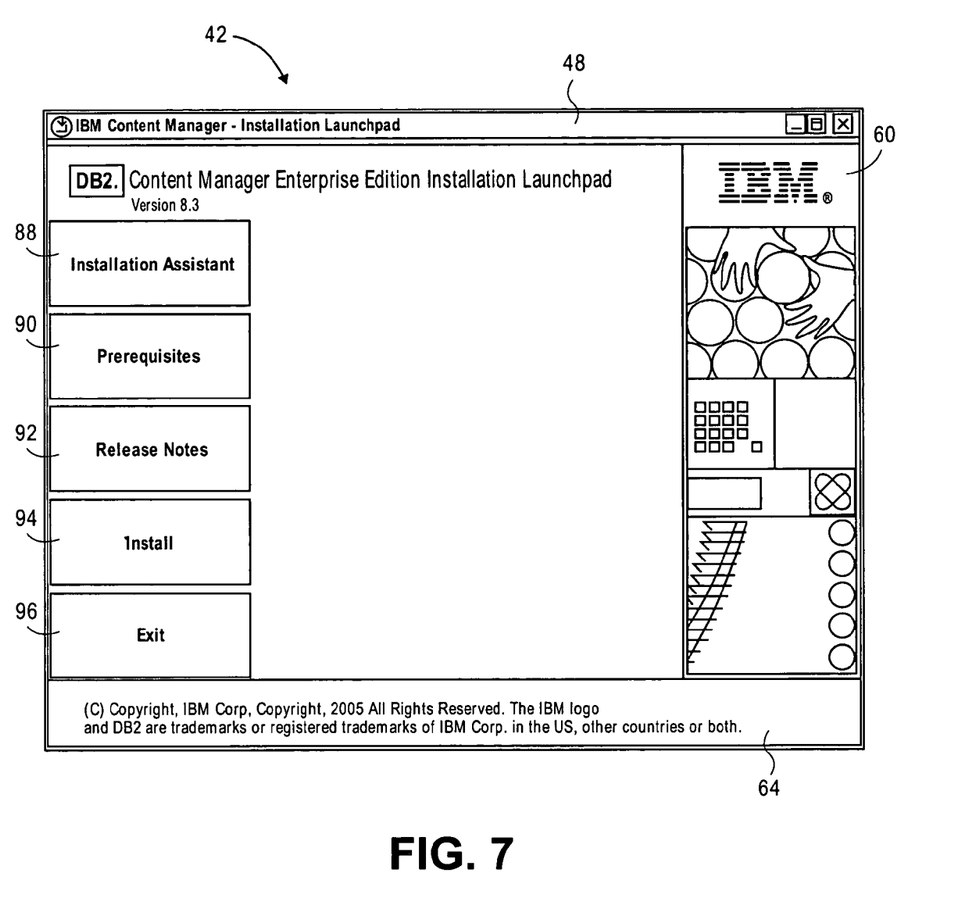
FIG. 7 is an exemplary user interface, including images and buttons as defined by the XML file of FIG. 4.

Some actions, such as an action associated with the "Exit" button 96 for terminating the program, may be entirely pre-defined and will not include a user-defined attribute. Other actions, such as an action associated with the "Release Notes" button 92 for displaying textual contents of a file in the user interface 42, will include a pre-defined action portion (retrieving and displaying the contents of a file) and a user-defined attribute (a name of the file to retrieve). Yet other actions may be entirely user-defined, wherein a user supplies executable code, such as a JAVA™ class file, along with any resources or attributes associated with the executable code. Finally, multiple actions may be associated with a single button, wherein a first action is entirely user-defined and a second action is entirely or partially pre-defined. An example of this latter scenario is a group of actions associated with the "Install" button 94, wherein a first action is entirely pre-defined and involves locating an operating system file of the host computer system, and a second action is entirely user-defined and involves linking the installed application to an existing application.

Figure 5:
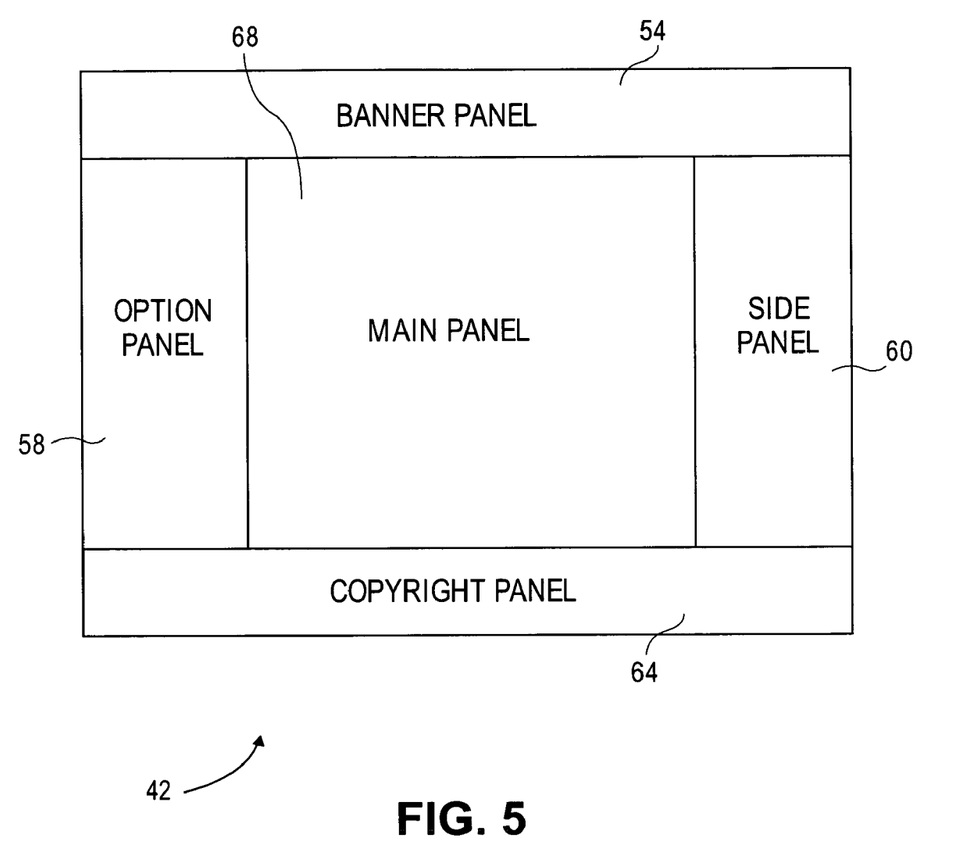
FIG. 5 is an exemplary layout of a user interface defined by the XML file of FIG. 4.

The "SidePanel" element 58 of the XML file 32 defines or indicates an attribute of a side panel 60 of the user interface 42, including an image to be displayed in the side panel 60. The "CopyrightPanel" element 62 of the XML file 32 defines or indicates an attribute of a copyright panel 64 of the user interface 42, including an image to be displayed in the copyright panel 64. Finally, the "MainPanel" element 66 of the XML file 32 defines or indicates an attribute of a main panel 68 of the user interface 42, including a background color or image to be displayed in the main panel 68.

Figure 6:
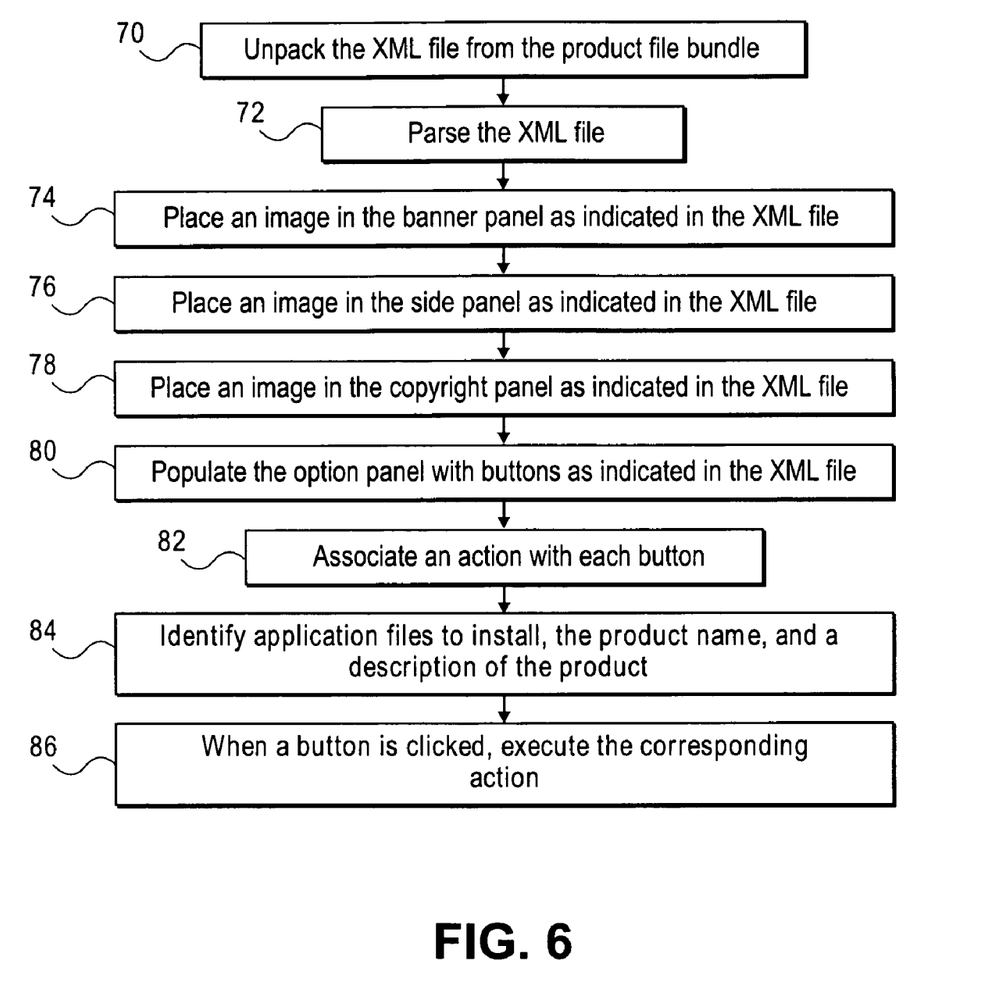
FIG. 6 is a flowchart of steps involved in a method of installing a computer application by building a user interface and performing actions according to attributes included in the XML file of FIG. 4.

A flowchart of steps involved in a method of creating an application launcher according to the present teachings is illustrated in FIG. 6. Some of the blocks of the flow chart may represent a module segment or portion of code of the computer program of the present invention which comprises one or more executable instructions for implementing the specified logical function or functions. In some alternative implementations, the functions noted in the various blocks may occur out of the order depicted in FIG. 6. For example, two blocks shown in succession in FIG. 6 may in fact be executed substantially concurrently, or the blocks may sometimes be executed in the reverse order depending upon the functionality involved.

In operation, the program first unpacks the XML file 32 from the product file group 30, as depicted in block 70. The program then parses the XML file 32, as depicted in block 72. In parsing the XML file 32, the program identifies the various elements discussed above and associates data taken from the file 32 with each element for use in constructing the user interface 42 and performing actions in response to user input received via the user interface.

The program then retrieves a user-identified banner image and displays the image in the banner panel 54, as depicted in block 74. The banner image may be, for example, 600 pixels by 60 pixels in size, and stretches across a top of the user interface 42. The banner image includes a title of the product. The program then retrieves a user-identified side panel image and displays the image in the side panel 60, as depicted in block 76. The side panel image may be, for example, 130 pixels by 340 pixels in size, and spans the right side of the user interface 42 between the banner panel 54 and the copyright panel 64. The side panel image is preferably a custom graphic relating to the particular implementation of the program. The program then retrieves a user-identified copyright image and places the image in the copyright panel 64, as depicted in block 78. The copyright image may be, for example, 600 pixels by 50 pixels in size, and stretches across a bottom of the user interface 42. The copyright image includes copyright information relating to the launcher. It will be appreciated that the sizes set forth above are exemplary in nature and may be substantially modified without departing from the scope of the present teachings.

The program than populates the option panel 58 with one or more buttons 88, 90, 92, 94, 96, as depicted in block 80. As explained above, these buttons drive various actions performed by the program, such as launching the system's default browser, displaying the contents of a text file, launching a product install browser, and executing a command, among others. The XML file 32 defines how many buttons will be displayed, what colors should be used in their default, highlighted, and clicked states, what text should be displayed, and what action should be fired when the buttons are clicked.

The XML file 32 indicates colors associated with the buttons as well as a resource bundle from which to load the button text, as explained above. Using resource bundles provides a simple way to create application launchers with locale-specific text. To create an application launcher with English text, for example, the user includes a resource bundle in the product bundle that has an English value corresponding to each key. If the user wishes to generate an application launcher with button text of a different language, the user includes a resource bundle with different values for each key.

The program associates an action with each button 88, 90, 92, 94, 96, according to the XML file 32. In the exemplary user interface, clicking on the "Installation Assistant" button 88 launches a helper program that guides the user through the installation process and allows the user to search information relating to the installation. Alternatively, clicking on the "Installation Assistant" button 88 may launch a web browser and load a pre-determined HTML file designed to provide the necessary guidance. Clicking on the "Prerequisites" or "Release Notes" buttons 90, 92 causes the program to load the contents of a corresponding text file into the main panel 68 of the user interface 42 for the user to review.

The program identifies an executable to install, a product name, and a description of the product, as depicted in block 84. The consumer employs the program to install a computer application and related files. The computer application and related files, referred to collectively at the application files 38, are provided by a user as part of the product files 30. The application files 38 will typically include one or more executable files constituting the application itself, as well as one or more resource files related to application and used by the executable files. Data included in the resource files may include text for use in help or guide functions of the application and images for presenting in a user interface.

Figure 8:
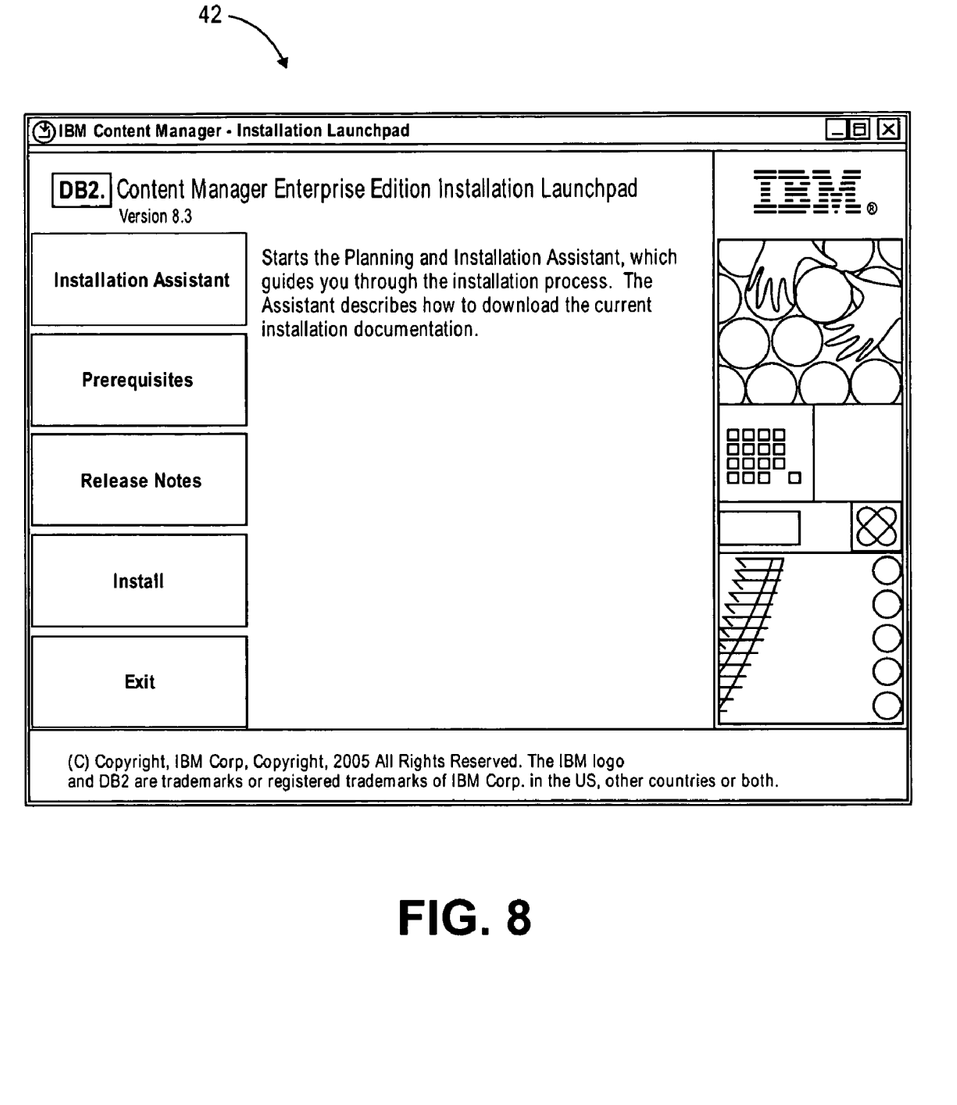
FIG. 8 is the user interface of FIG. 7, wherein a first button is highlighted and corresponding float-over text is displayed.

When the user interface 42 has been created and action attributes have been identified and associated with corresponding buttons, the program responds to user interaction with the user interface 42 by executing one or more of the actions, as depicted in block 86. FIGS. 7-10 illustrate an exemplary user interface 42 constructed by a computer according to the program of the present invention, wherein the program responds to various user inputs received via the interface 42. FIG. 7 illustrates the interface 42 populated with various images and buttons according to the XML file. FIG. 8 illustrates the "Installation Assistant" button 88 highlighted in response to, for example, a pointer being placed over the button 88. The program highlights the button 88 by applying to it a different color, and simultaneously presents float-over text in the main panel 68 of the interface 42 describing the function of the installation assistant. Both the highlight color and the float-over text are defined by the user in the XML file, a resource bundle file, a text file, or a combination thereof.

Figure 9:
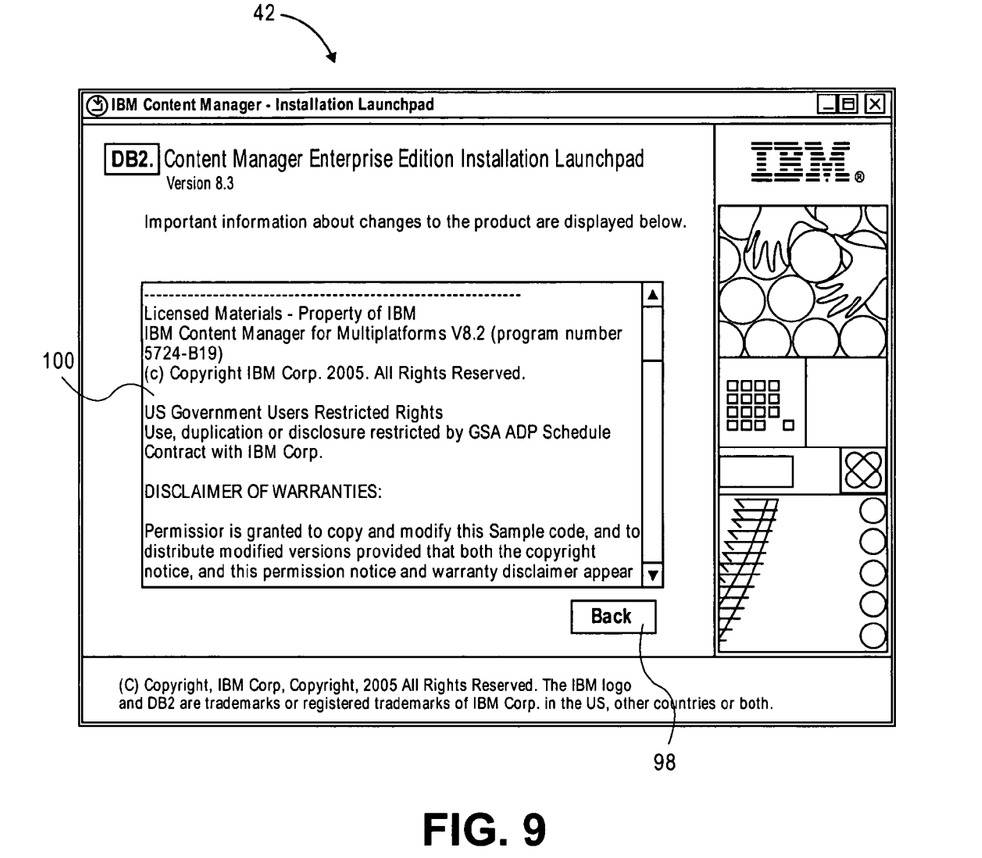
FIG. 9 is the user interface of FIG. 7, wherein information is displayed in response to the selection of a second button.

In FIG. 9, the interface 42 is shown responding to a user selecting the "Release Notes" button 92. The textual contents 100 of a file are displayed in a scrollable window of the main panel 68 of the interface 42, wherein the contents 100 describe aspects of the application file to be installed, including version information, ownership information, and warranty information. Selecting a "Back" button 98 causes the program to return to the previous interface view.

Figure 10:
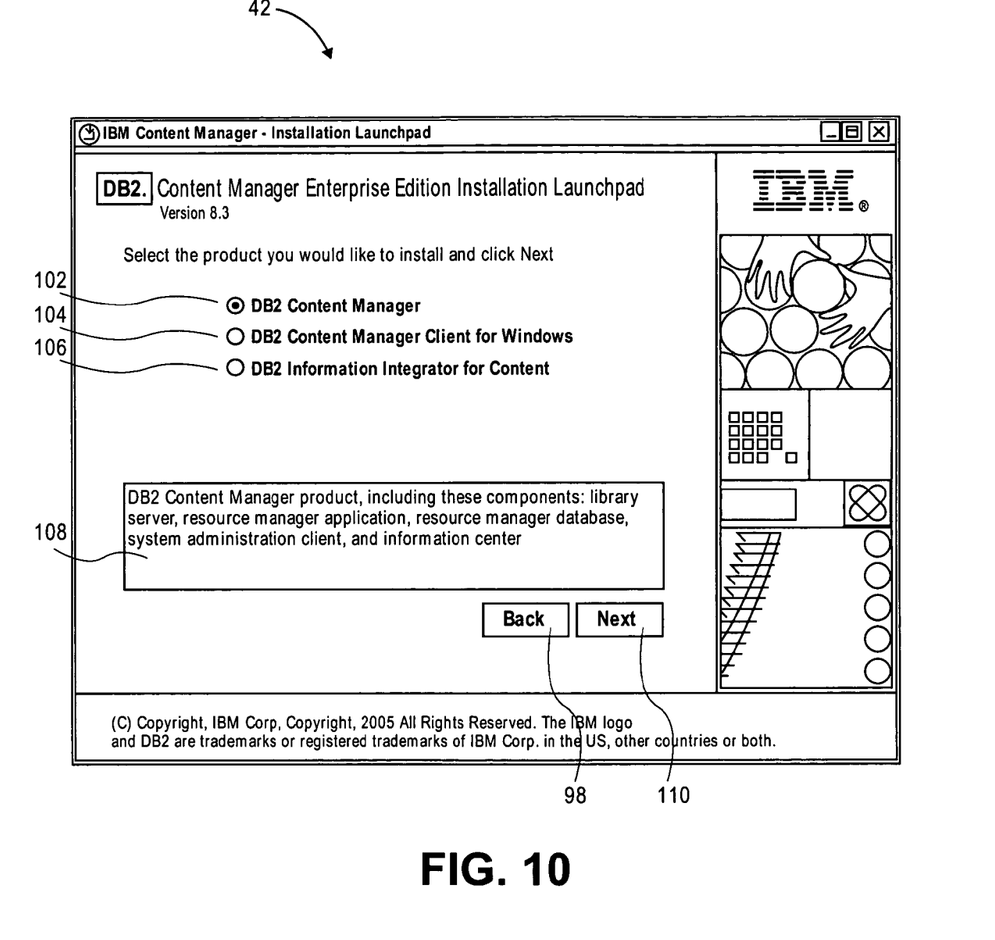
FIG. 10 is the user interface of FIG. 7, wherein radio buttons are displayed as part of a series of actions performed in response to the selection of a third button.

As explained above, selecting the "Install" button 94 causes the program to perform one or more actions relating to installation of the application and related files on a computer. As illustrated in FIG. 10, one of the installation actions may include presentation of a series of radio buttons 102, 104, 106 for enabling a user to choose one or more products to be installed. A text field 108 presents information relating to a product currently selected via the radio buttons 102, 104, 106. Selecting the "Back" button 98 causes the program to return to a previous installation step, while selecting the "Next" button 110 causes the program to proceed to the next installation step.

The section headings used herein are for organizational purposes only and are not to be construed as limiting the subject matter described in any way. All literature and similar materials cited in this application, including but not limited to, patents, patent applications, articles, books, treatises, and internet web pages, regardless of the format of such literature and similar materials, are expressly incorporated by reference in their entirety for any purpose.

While the present teachings are described in conjunction with various embodiments, it is not intended that the present teachings be limited to such embodiments. On the contrary, the present teachings encompass various alternatives, modifications, and equivalents, as will be appreciated by those of skill in the art.

What is claimed is:

1. A computer-readable medium encoded with a computer program for enabling a computer to perform a method of installing an application, the method comprising the steps of:

reading a user-created Extensible Markup Language (XML) file to determine a plurality of user-specified attributes of a user interface, wherein the attributes include button information and image information;

requesting user interface data from a user-supplied resource object that is identified in the XML file by communicating to the object a key that is given in the XML file;

receiving a plurality of text strings from the resource object and presenting the text strings as part of the user interface, wherein each text string is associated with an element of the user interface as indicated in the XML file;

parsing the XML file to determine a user-specified attribute of each of a plurality of pre-determined installation actions, and to identify computer code for executing a user-defined installation action;

displaying a plurality of buttons in a first pre-defined panel of the user interface, wherein each button is displayed as indicated in the XML file;

displaying the contents of a user-supplied computer file in the user interface in response to a user selecting a first button, wherein the computer file is identified in the XML file;

launching a separate application in response to the user selecting a second button, wherein the application is launched with start-up characteristics defined in the XML file; and installing an application file on the computer in response to the user selecting a third button, wherein the application file is identified in the XML file.

2. The computer-readable medium as set forth in claim 1, the method further comprising the steps of:

reading the XML file to identify a plurality of images to present as part of the user interface; and displaying the images on pre-defined interface panels as indicated in the XML file, wherein the XML file includes a file name associated with each image, and further includes metadata indicating a panel each image corresponds to.

3. The computer-readable medium as set forth in claim 1, wherein the XML file includes a file name associated with the application file, and further includes metadata indicating the file name identifies an application file.

4. The computer-readable medium as set forth in claim 1, the method further comprising the steps of:

reading the XML file to identify a second file containing text to display in the user interface; and displaying the text in response to a user input received via the user interface wherein the XML file includes a file name associated with the second file.

5. The computer-readable medium as set forth in claim 1, the method further comprising the steps of:
   identifying a user-specified separate application pre-installed on the computer and a user-specified launch characteristic; and
   launching the separate application according to the user-specified launch characteristic in response to a user input received via the user interface.

6. The computer-readable medium as set forth in claim 1, wherein the XML file includes metadata identifying the user-specified attribute of the user interface and metadata identifying the user-specified attribute of the pre-determined installation action.

7. The computer-readable medium as set forth in claim 1, the method further comprising the steps of:
   reading the XML file to identify user-supplied computer code segment associated with a user-defined launch action; and
   executing the user-supplied executable code in response to a user input received via the user interface,
   wherein the XML file includes a file name associated with the executable code, and further includes metadata indicating the file is containing the computer code segment.

8. A method of installing a computer application, the method comprising the steps of:
   reading a user-created XML file to determine a plurality of user-specified attributes of a user interface, wherein the attributes include a button information and image information;
   requesting user interface data from a user-supplied resource object that is identified in the XML file, and requesting user interface data from the resource object by communicating to the object a key provided in the XML file;
   receiving a plurality of text strings from the resource object and present the text strings as part of the user interface, wherein each text string is associated with an element of the user interface as indicated in the XML file;
   parsing the XML file to determine a user-specified attribute of each of a plurality of a pre-determined installation actions, and to identify computer code for executing a user-defined installation action;
   displaying a plurality of buttons in a first pre-defined panel of the user interface, wherein each button is displayed as indicated in the XML file;
   launching a separate application in response to the user selecting a second button, wherein the application is launched with start-up characteristics defined in the XML file; and
   installing an application file on the computer in response to the user selecting a third button, wherein the application file is identified in the XML file.

9. The method as set forth in claim 8, further comprising the steps of:
   reading the XML file to identify a plurality of images to present as part of the user interface; and
   displaying the images on pre-defined interface panels as indicated in the XML file, wherein the XML file includes a file name associated with each image, and further includes metadata indicating a panel each image corresponds to.

10. The method as set forth in claim 8, wherein the XML file includes a file name associated with the application file, and further includes metadata indicating the file name identifies an application file.

11. The method as set forth in claim 8, further comprising the steps of:
   reading the XML file to identify a second file with text to display in the user interface; and
   displaying the text in response to a first user input.

12. The method as set forth in claim 8, further comprising the steps of:
   reading the XML file to identifying a user-specified separate application pre-installed on the computer and a user-specified launch characteristic; and
   launching the separate application according to the user-specified launch characteristic in response to a third user input received via the user interface.

13. The method as set forth in claim 8, wherein the user-created XML file includes metadata identifying the user-specified attribute of the user interface and metadata identifying the user-specified attribute of the pre-determined installation action.

14. An apparatus for installing an application on a computer, the apparatus operable to:
   parse a user-created XML file to determine a plurality of user-specified attributes of a user interface, wherein the attributes include button information and image information;
   request user interface data from a user-supplied resource object that is identified in the XML file by communicating to the object a key that is given in the XML file;
   receive a plurality of text strings from the resource object and present the text strings as part of the user interface, wherein each text string is associated with an element of the user interface as indicated in the XML file;
   parse the XML file to determine a user-specified attribute of each of a plurality of pre-determined installation actions, and to identify computer code for executing a user-defined installation action;
   display a plurality of buttons in a first pre-defined panel of the user interface, wherein each button is displayed as indicated in the XML file;
   display the contents of a user-supplied computer file in the user interface in response to a user selecting a first button, wherein the computer file is identified in the XML file;
   launch a separate application in response to the user selecting a second button, wherein the application is launched with start-up characteristics defined in the XML file; and
   install an application file on the computer in response to the user selecting a third button,
   wherein the application file is identified in the XML file.

* * * * *